United States Patent
Webber et al.

(10) Patent No.: US 7,410,114 B2
(45) Date of Patent: Aug. 12, 2008

(54) COMPACT DUAL-LEVEL LOAD LIMITING SEAT BELT RETRACTOR

(75) Inventors: James L. Webber, Shelby Township, MI (US); James R. Wilde, Farmington Hills, MI (US); Michael T. Moury, Shelby Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 149 days.

(21) Appl. No.: 11/519,537

(22) Filed: Sep. 12, 2006

(65) Prior Publication Data
US 2008/0061180 A1  Mar. 13, 2008

(51) Int. Cl.
*B60R 22/28* (2006.01)
(52) U.S. Cl. ............... 242/379.1; 242/382; 280/805
(58) Field of Classification Search ........... 242/379.1, 242/382, 381, 382.1, 383, 384; 280/805
See application file for complete search history.

(56) References Cited

U.S. PATENT DOCUMENTS

| | | | |
|---|---|---|---|
| 5,626,306 A * | 5/1997 | Miller et al. ............. | 242/379.1 |
| 5,938,135 A * | 8/1999 | Sasaki et al. ............. | 242/374 |
| 6,241,172 B1 | 6/2001 | Fugel et al. | |
| 6,616,081 B1 | 9/2003 | Clute et al. | |
| 6,648,260 B2 | 11/2003 | Webber et al. | |
| 2002/0070307 A1 * | 6/2002 | Hiramatsu et al. ........ | 242/379.1 |
| 2004/0262441 A1 * | 12/2004 | Hiramatsu ................ | 242/379.1 |
| 2006/0022447 A1 | 2/2006 | Kohlndorfer et al. | |

* cited by examiner

*Primary Examiner*—Peter M. Cuomo
*Assistant Examiner*—Stefan Kruer
(74) *Attorney, Agent, or Firm*—Douglas D. Fekete

(57) ABSTRACT

A seat belt retractor having first and second serially arranged torsion bars and a switching mechanism provides two levels of load limiting. A bridge bolt rotationally fixed to the inboard ends of the torsion bars is threaded into a locking base, and the switching mechanism prevents bridge bolt translation relative to the locking base in a default condition to limit seat belt load with the first torsion bar. Activation of the switching mechanism permits limited translation of the bridge bolt relative to the locking base to limit seat belt load with the second torsion bar. Additional translation of the bridge bolt relative to the locking base is prevented to re-establish load limiting with the first torsion bar. The switching mechanism includes a set of detent wedges, a retaining band and an electrically activated cutting mechanism, all disposed within the retractor frame.

7 Claims, 8 Drawing Sheets

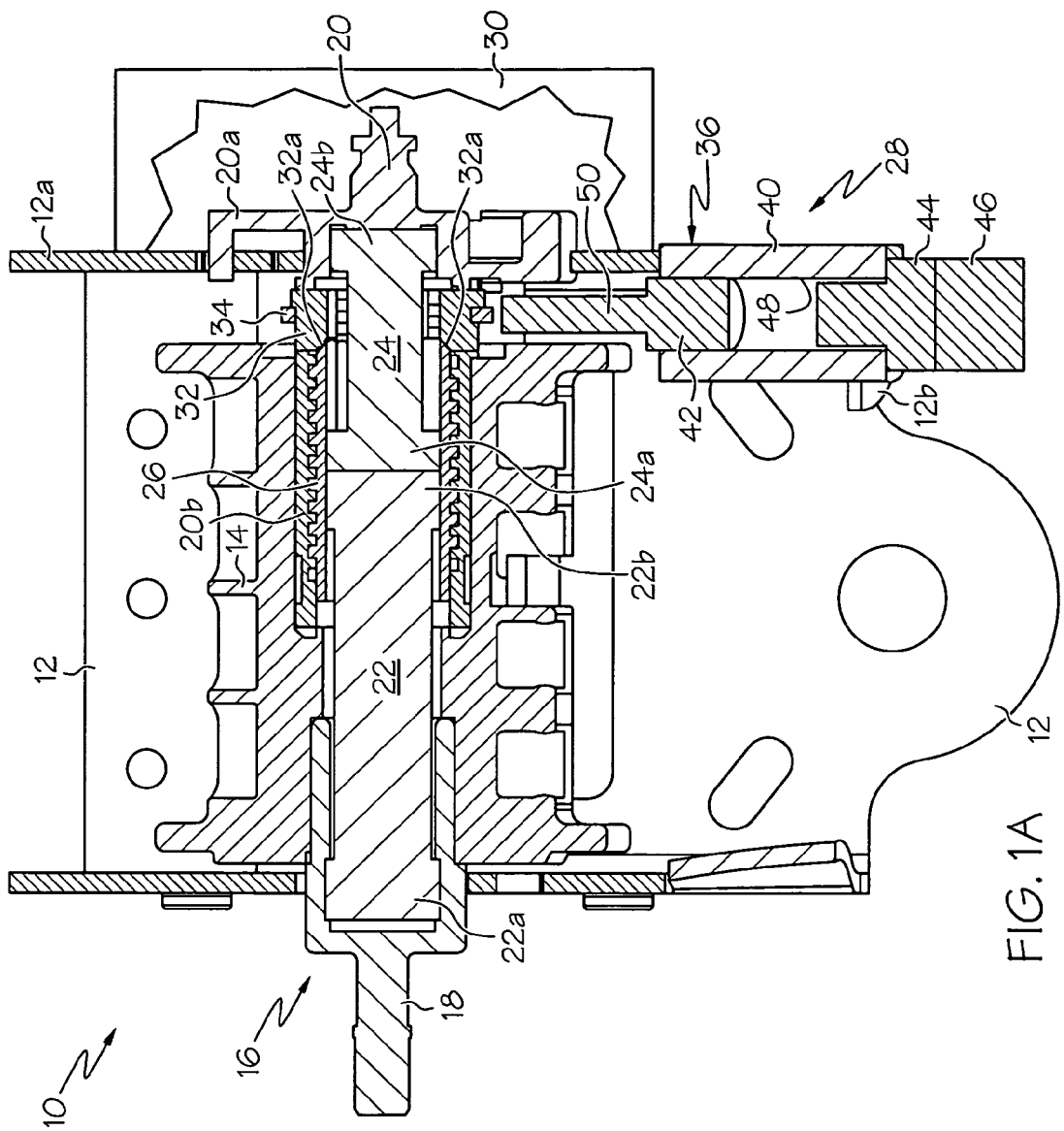

COMPACT DUAL-LEVEL LOAD LIMITING SEAT BELT RETRACTOR

TECHNICAL FIELD

The present invention relates to automotive seat belt retractors, and more particularly to a space-efficient and cost-effective mechanism for achieving dual-level load limiting.

BACKGROUND OF THE INVENTION

Load limiting seat belt retractors utilize a mechanical energy-absorbing element such as a torsion bar to control the restraining force exerted on an occupant during an actual or anticipated crash event by paying out a relatively small amount of the seat belt for a specified load. Since the desired level of load limiting varies depending on the weight of the occupant and the severity of the crash event, some retractors (referred to herein as dual-level load limiting retractors) incorporate two different energy-absorbing elements and a switching mechanism for selectively changing the load limit by changing the mechanical load path through the retractor. See, for example, the U.S. Patent Publication No. 2006/0022447, and the U.S. Pat. Nos. 6,241,172, 6,616,081 and 6,648,260. However, known dual-level load limiting retractors are relatively expensive to produce, and tend to be difficult to package in a vehicle door pillar due to their increased size. Accordingly, what is needed is a dual-level load limiting retractor that is cost-effective to manufacture and compact in size.

SUMMARY OF THE INVENTION

The present invention is directed to an improved dual-level load limiting seat belt retractor including a seat belt spool supported in a frame, first and second serially disposed torsion bars, a linearly shiftable bridge bolt, a locking base, and a switching mechanism. The spool is rotationally fixed to the outboard end of the first torsion bar, and the inboard ends of the first and second torsion bars are rotationally fixed to the bridge bolt. The bridge bolt is threaded into the locking base, and in a default condition, the switching mechanism prevents relative rotation and lateral translation of the bridge bolt with respect to the locking base to establish a first level of load limiting due to energy absorption by the first torsion bar. When the switching mechanism is activated during a crash event, the bridge bolt is permitted to rotate with respect to the locking base by a limited amount to establish a second level of load limiting due to energy absorption by the second torsion bar. Following the limited rotation, the further lateral translation of the bridge bolt with respect to the locking base is prevented to re-establish the first level of load limiting.

The switching mechanism includes a set of detent wedges, a retaining band and an electrically activated cutting mechanism, all disposed between the seat belt spool and the retractor frame. The retaining band circumscribes the wedges to retain them in openings formed in the locking base, blocking translation of the bridge bolt with respect to the locking base. When the cutting mechanism is activated, it severs the retaining band to allow radial outward movement of the wedges and the limited rotation of the bridge bolt with respect to the locking base.

BRIEF DESCRIPTION OF THE DRAWINGS

FIG. 1A is a sectional view of a dual-level load limiting seat belt retractor according to the present invention;

DESCRIPTION OF THE PREFERRED EMBODIMENT

Figure 1B:
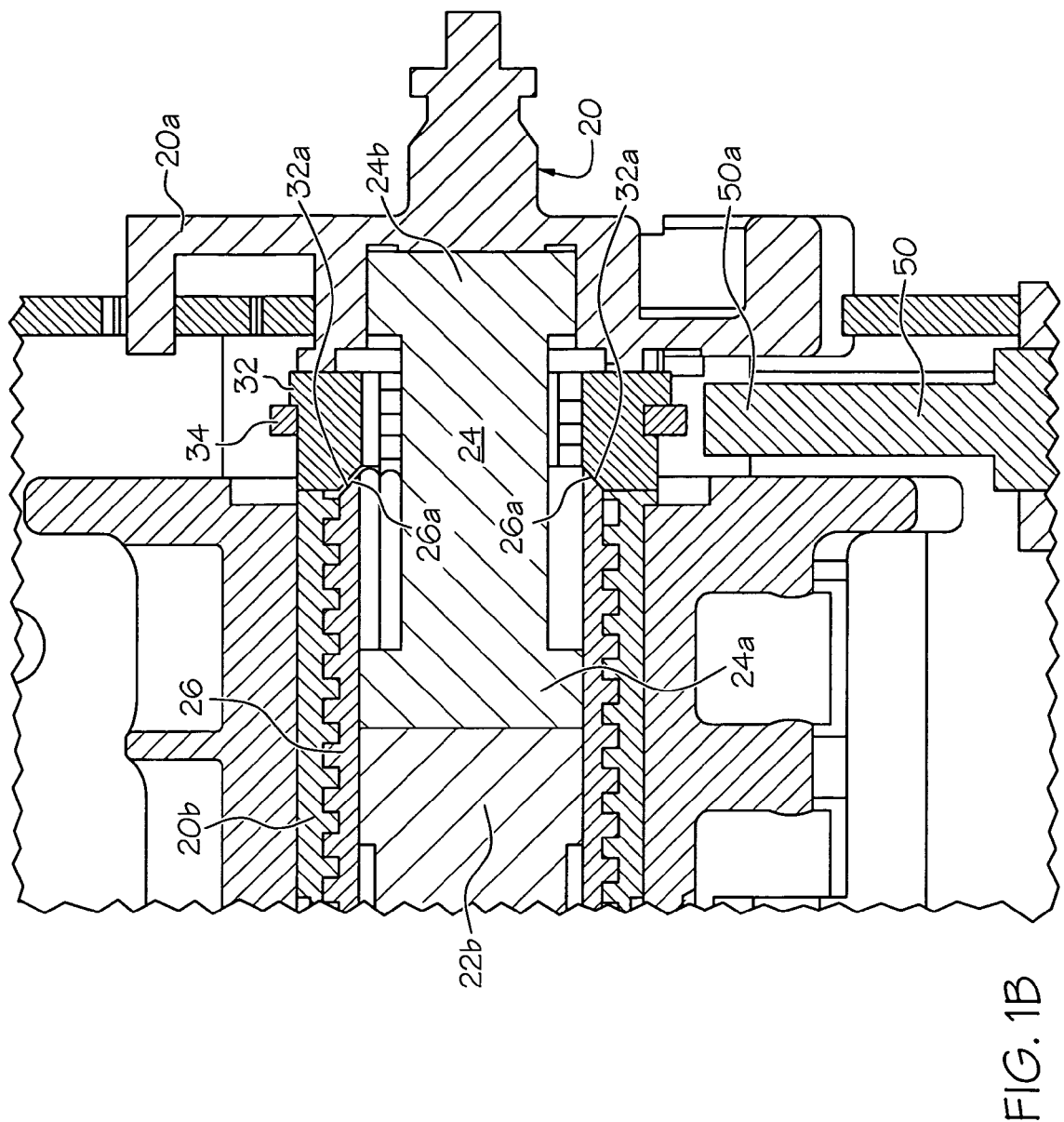
FIG. 1B is an enlarged portion of the sectional view of FIG. 1A.
Figure 2:
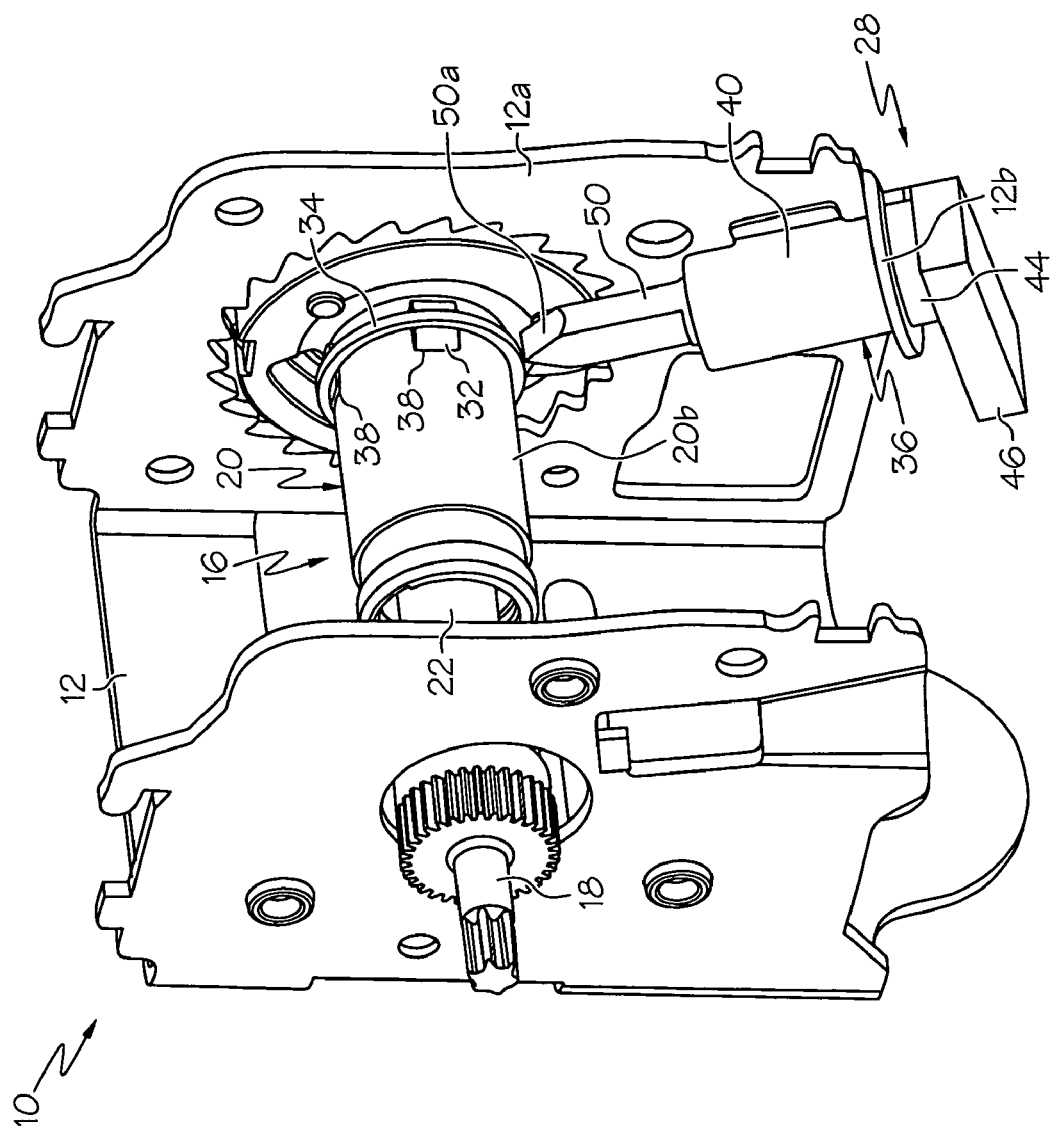
FIG. 2 is an isometric view of the seat belt retractor of FIG. 1A with the seat belt spool removed to show a switching mechanism that is selectively activated to change the mechanical load path through the retractor.

Referring to FIGS. 1A, 1B and 2, the reference numeral 10 generally designates a partially assembled dual-level load limiting seat belt retractor for a motor vehicle according to the present invention. The illustrated assembly includes a metal frame 12 that is mounted in a vehicle door pillar, a spool 14 on which the seat belt (not shown) is wound, and a spool support assembly 16 that couples the spool 14 to the frame 12. The spool support assembly 16 includes a spool connector 18, a locking base 20, first and second torsion bars 22 and 24, a bridge bolt 26, and a switching mechanism 28. The first and second torsion bars 22 and 24 are arranged coaxial with the locking base 20. The spool 14 and outboard end 22a of the first torsion bar 22 are rotationally fixed to the spool connector 18. The bridge bolt 26 is internally splined, and rotationally fixes the inboard end 22b of the first torsion bar 22 to the inboard end 24a of the second torsion bar 24. The outboard end 24b of the second torsion bar 24 is rotationally fixed to the locking base 20. The locking base 20 has an end portion 20a that passes through a sidewall 12a of frame 12, and an annulus 20b disposed within the frame 12. The bridge bolt 26 is disposed within the annulus 20b of locking base 20, and is provided with exterior threads that meshingly engage complementary threads formed on the inner periphery of annulus 20b. The switching mechanism 28 is disposed between the spool 14 and frame 12, and ordinarily prevents lateral displacement of the bridge bolt 26 toward the end portion 20a of locking base 20 due to relative rotation between it and the locking base 20.

A take-up spring (not shown) coupled to the spool connector 18 rotationally biases the spool support assembly 16 in a direction to retract the seat belt. Apart from this spring bias, the components of spool support assembly 16 are free to rotate with respect to the frame 12 during normal usage. In the event of an actual or anticipated crash event, however, a locking mechanism 30 (shown in outline in FIG. 1) responsive to vehicle deceleration and/or rapid payout of the seat belt mechanically engages the locking base 20 to the frame 12. Although the locking mechanism 30 prevents further rotation of the locking base 20, the torsion bars 22 and 24 provide a load limiting function when the force applied to the seat belt reaches a predetermined level by absorbing mechanical energy while allowing a limited amount of additional seat belt payout. The torsion bars 22 and 24 have different energy absorption characteristics due to differences in their geometry, and two different levels of load limiting are achieved depending on which torsion bar is absorbing energy. The default energy absorption level is determined by the first torsion bar 22, which begins absorbing energy at a relatively high load level due to its relatively large size (compared to torsion bar 24). A lower energy absorption level determined by the second torsion bar 24 can be selectively activated in the course of an actual or anticipated crash event to allow limited seat belt payout at a lower load level. This may be appropriate, for example, if the occupant is relatively small and/or the crash severity is relatively low.

Selective activation of the lower energy absorption level is achieved with the switching mechanism 28, which includes a set of detent wedges 32, a retainer band 34, and a pyrotechnically deployed cutting mechanism 36. The detent wedges 32 are received in a set of openings 38 formed in the annulus 20b of locking base 20 between the spool 14 and retractor frame 12. The retainer band 34 circumscribes the detent wedges 32, and retains them within the respective openings 38. The inboard face 32a of each detent wedge 32 is cammed, and when the detent wedges 32 are retained in the openings 38, their cammed faces 32a engage a complementary cammed surface 26b formed on the end of bridge bolt 26. As indicated above, this prevents lateral displacement of the bridge bolt 26 toward the end portion 20a of locking base 20 due to relative rotation between it and the locking base 20. As explained below, activating cutting mechanism 36 severs the retaining band 34, establishing a period of low energy absorption as the bridge bolt 26 rotates with respect to the locking base 20 and thereby moves laterally toward the end portion 20a of locking base 20.

The cutting mechanism 36 includes a generally cylindrical housing 40 captured in a mounting flange 12b of retractor frame 12, a piston 42, a squib 44, and an electrical connector 46. The piston 42 is disposed within an axial bore 48 of housing 40 and includes an integral chisel-point pintle 50 that extends out of bore 48 toward the retaining band 34. Electrical activation of the squib 44 charges the housing bore 48 with pressurized gas, thereby displacing piston 42 outward and causing the chisel-point 50a of pintle 50 to strike and sever the retaining band 34.

The operation of the retractor 10 is now described with respect to FIGS. 3A-3C, 4A-4C and 5A-5C. It is assumed for purposes of the description that an actual or anticipated crash event is in progress, and the locking mechanism 30 has mechanically engaged locking base 20 to the retractor frame 12.

Figure 3A:
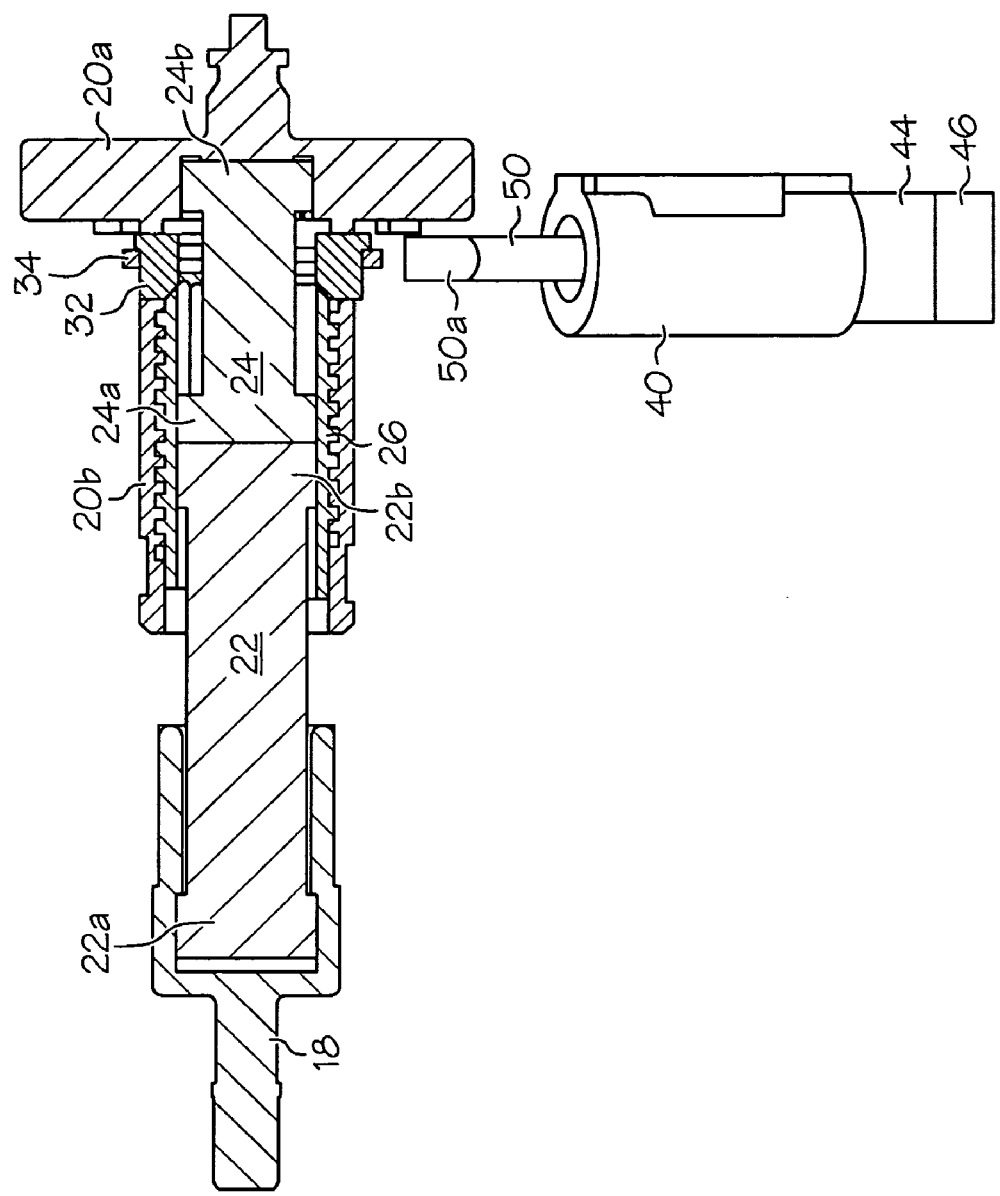
FIG. 3A is simplified cross-sectional diagram of the seat belt retractor of FIG. 1A in a default condition providing a first level of load limiting.
Figure 4C:
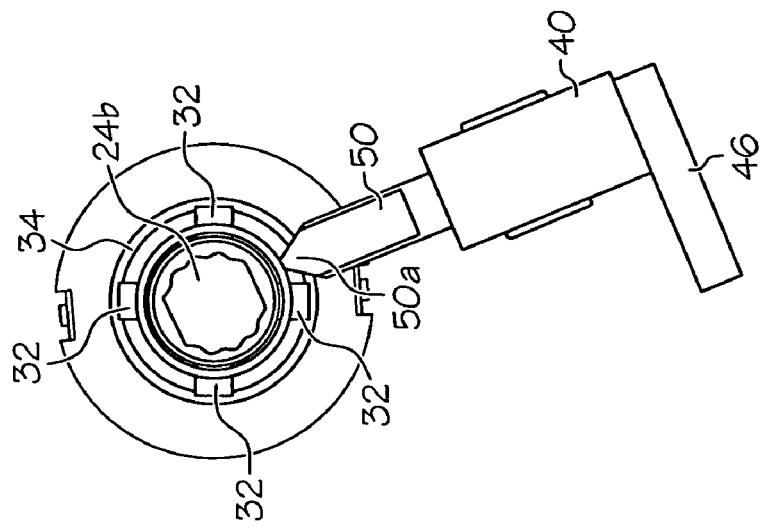
FIG. 4C is an end-view of the seat belt retractor of FIG. 1A, with the switching mechanism in a post-activation condition.
Figure 4B:
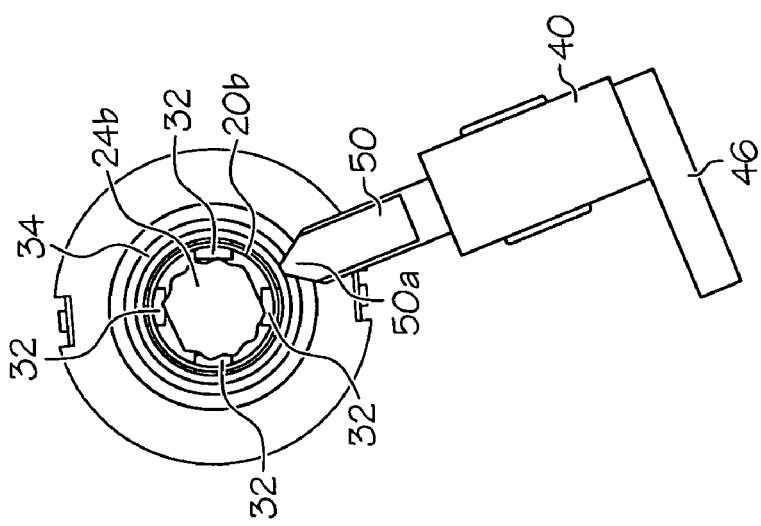
FIG. 4B is an end-view of the seat belt retractor of FIG. 1A, depicting activation of the switching mechanism.
Figure 4A:
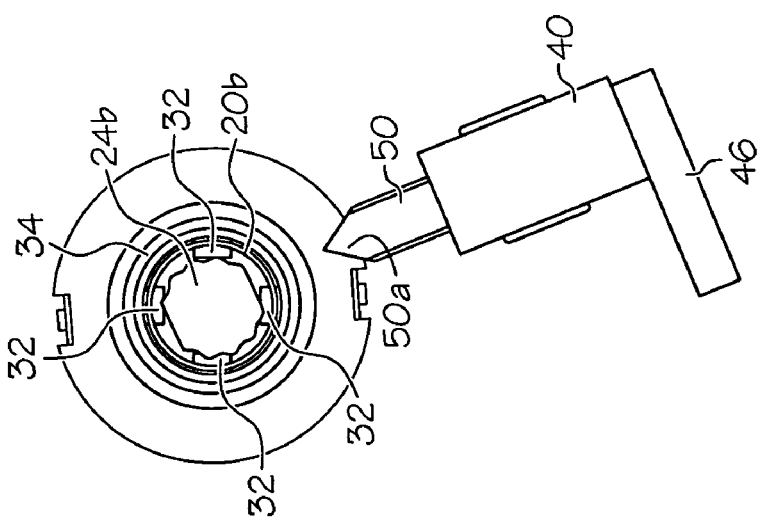
FIG. 4A is an end-view of the seat belt retractor of FIG. 1A, with the switching mechanism in a default condition.
Figure 5A:
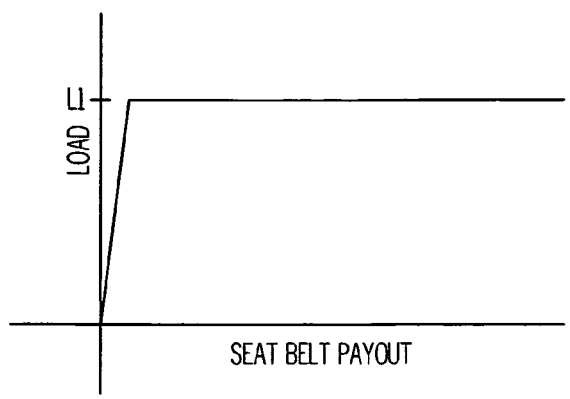
FIG. 5A is a graph depicting seat belt load as a function of seat belt payout for the default condition depicted in FIG. 3A.

FIGS. 3A, 4A and 5A depict an initial or default condition in which the cutting mechanism 36 is not activated, and the retaining band 34 retains the detent wedges 32 in the openings 38 of locking base 20. In this condition, the bridge bolt 26 is rotationally fixed to the locking base 20. The force (load) applied to the seat belt rises rapidly once the locking base 20 engages the frame 12 and the occupant moves forward. The corresponding torque applied to the spool 14 is transferred to the outboard end 22a of the first torsion bar 22 through the spool connector 18. The inboard end 22b of the first torsion bar 22 attempts to rotate the bridge bolt 26, but cannot since the bridge bolt 26 is rotationally fixed to the locking base 20 as mentioned above. In other words, the bridge bolt 26 reinforces the torsion bar 24 when rotationally locked, so that the second torsion bar 24 is effectively bypassed. When the load reaches a predetermined limit L1, the first torsion bar 22 twists to absorb energy while permitting limited additional seat belt payout as depicted in FIG. 5A. If the high level load limit condition is deemed to be appropriate given the occupant size and crash severity, the cutting mechanism 36 is not activated, and the load limiting continues at the level L1 until the occupant energy is expended.

Figure 3B:
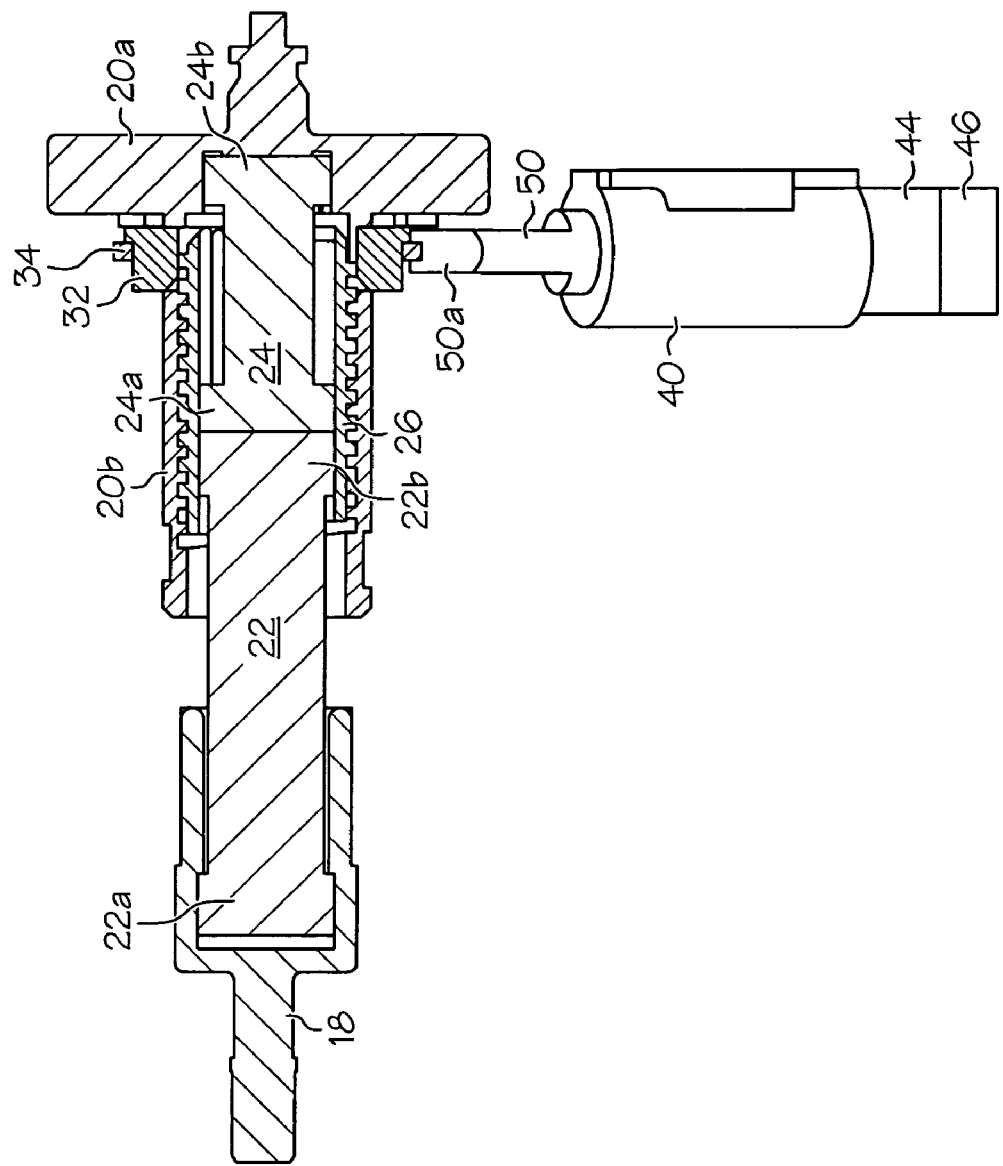
FIG. 3B is simplified cross-sectional diagram of the seat belt retractor of FIG. 1A in an activated condition providing a second level of load limiting.
Figure 3C:
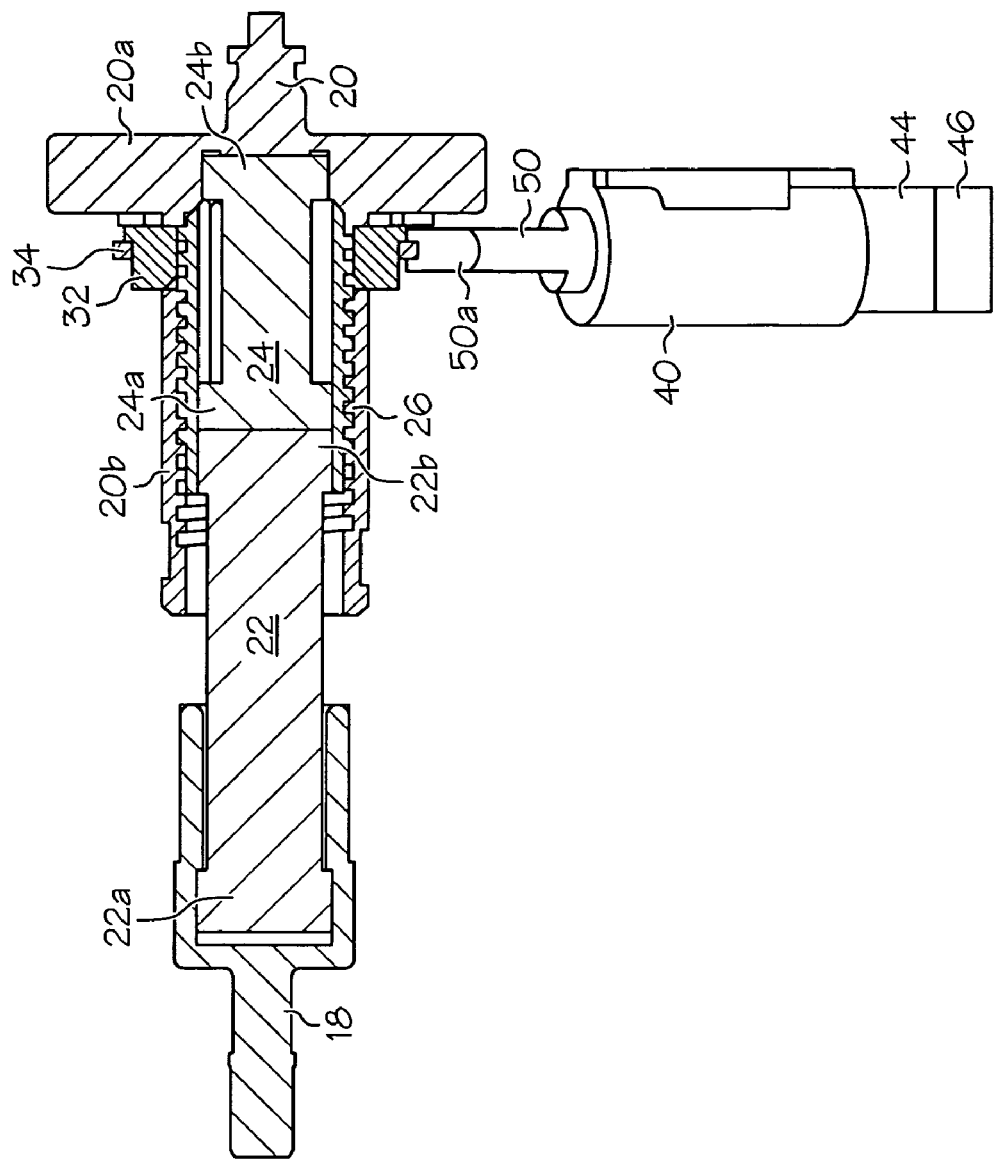
FIG. 3C is simplified cross-sectional diagram of the seat belt retractor of FIG. 1A in a post-activation condition providing the first level of load limiting.
Figure 5B:
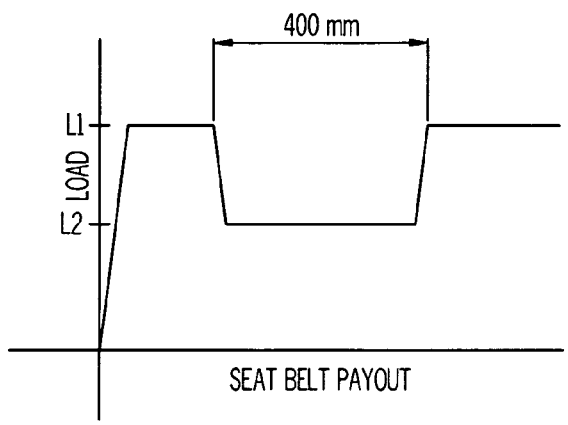
FIG. 5B is a graph depicting seat belt load as a function of seat belt payout for the activated condition depicted in FIG. 3B.
Figure 5C:
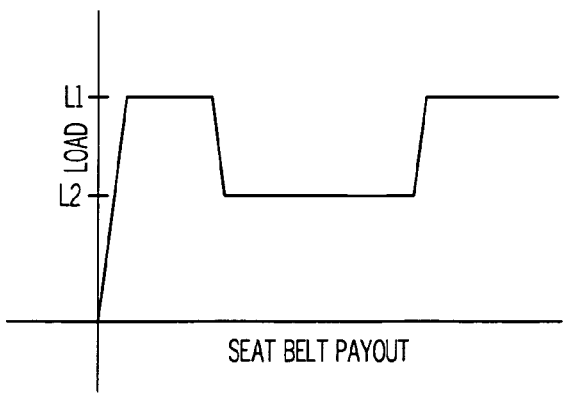
FIG. 5C is a graph depicting seat belt load as a function of seat belt payout for the post-activation condition depicted in FIG. 3C.

If it is determined that a lower level load limit is desired, the cutting mechanism 36 is activated as depicted in FIG. 4B. This severs the retaining band 34 and allows the bridge bolt 26 to drive the detent wedges 32 radially outward by camming action as depicted in FIG. 4C. With the detent wedges 32 shifted out of the way, the bridge bolt 26 rotates within the annulus 20b of locking base 20 and moves laterally rightward as depicted in FIG. 3B. The inboard ends 22b and 24a of the first and second torsion bars 22 and 24 rotate with the bridge bolt 26, placing the second torsion bar 24 in series with the first torsion bar 22. Since the second torsion bar 24 has a lower energy absorption characteristic than the first torsion bar 22, the seat belt load drops to a lower level L2 as the seat belt continues its load-limited payout; see FIG. 5B. This condition prevails until rightward lateral movement of the bridge bolt 26 is prevented due to its engagement with the end portion 20a of locking base 20 as depicted in FIG. 3C. During this low-level interval of load limiting, the seat belt may payout an additional 400 mm or so, as indicated in FIG. 5B. When the cammed end of bridge bolt 26 engages the end portion 20a of locking base 20, the bridge bolt 26 is once again rotationally fixed to the locking base 20, and the bridge bolt 26 effectively by-passes the second torsion bar 24. At such point, the first torsion bar 22 is the only energy-absorbing element in the load path, and load limiting can only continue at the upper load limit L1 as depicted in FIG. 5C.

As best seen in FIGS. 1A and 2, the retractor 10 of the present invention achieves a dual-level load limiting functionality without significantly increasing its size. Unlike prior dual-level load limiting retractors, the switching mechanism 28 is disposed within the retractor frame 12, and the increased functionality is achieved without significantly increasing the retractor width. As a result, the packaging drawbacks associated with prior dual-level load limiting retractors are avoided. At the same time, the additional manufacturing cost required to achieve the increased functionality is relatively low, as the individual components are relatively inexpensive to manufacture and easy to assemble.

In summary, the retractor 10 of the present invention presents a compact and low-cost alternative to other dual-level load limiting retractors. While described with respect to the illustrated embodiment, it is recognized that numerous modifications and variations in addition to those mentioned herein will occur to those skilled in the art. For example, the first and second torsion bars 22 and 24 can be formed as a single element instead of two separate elements, and so on. Accordingly, it is intended that the invention not be limited to the disclosed embodiment, but that it have the full scope permitted by the language of the following claims.

The invention claimed is:

1. A dual-level load limiting seat belt retractor for a vehicle, comprising:

a locking base rotatably supported by a frame but locked to said frame in an actual or anticipated crash event;

first and second serially arranged torsion bars coaxial with said locking base;

a seat belt spool rotationally fixed to an outboard end of said first torsion bar;

a bridge bolt rotationally fixed to inboard ends of said first and second torsion bars, and threaded into said locking base;

one or more wedges captured in said locking base to block rotation and lateral translation of said bridge bolt with respect to said locking base for establishing a first level of seat belt load limiting due to energy absorption by the first torsion bar; and a switching mechanism selectively activated in said crash event to release said one or more wedges to establish a second level of load limiting due to energy absorption by the second torsion bar.

2. The seat belt retractor of claim 1, further comprising:

a set of wedges captured in said locking base between said spool and said frame to block rotation and lateral translation of said bridge bolt with respect to said locking base;

a retaining ring circumscribing said wedges for retaining said wedges in a blocking condition in respect to said bridge bolt; and a cutting tool advanced by activation of said switching mechanism for severing said retaining ring to release said wedges.

3. The seat belt retractor of claim 1, where said first level of seat belt load limiting due to energy absorption by the first torsion bar is re-established following a limited rotation and translation of said bridge bolt with respect to said locking base.

4. The seat belt retractor of claim 2, wherein:

said wedges abut an end of said bridge bolt to block rotation and lateral translation of said bridge bolt with respect to said locking base; and abutting surfaces of said wedges and bridge bolt are cammed to move said wedges radially outward when released by severing of said retaining ring.

5. The seat belt retractor of claim 4, where said switching mechanism is mounted within said frame.

6. A dual-level load limiting seat belt retractor for a vehicle, comprising:

first and second torsion bars;

a seat belt spool rotationally fixed to one of said first and second torsion bars;

a bridge element that when rotationally locked reinforces the second torsion bar;

a movable detent member alternately positioned in a blocking state to block rotation of said bridge element for establishing a first level of seat belt load limiting due to energy absorption by the first torsion bar, and a released state to allow rotation of said bridge element to establish a second level of load limiting due to energy absorption by the second torsion bar;

a retaining ring circumscribing said detent member for retaining said detent member in said blocking state; and a selectively activated cutting tool for severing said retaining ring and allowing said detent member to move to said released state.

7. The seat belt retractor of claim 6, where an interface between said detent member and said bridge element biases said detent member toward said released state when said cutting tool severs said retaining ring.

* * * * *